US008339896B2

(12) United States Patent
van Borselen et al.

(10) Patent No.: US 8,339,896 B2
(45) Date of Patent: Dec. 25, 2012

(54) METHOD FOR SEPARATING SEISMIC SOURCES IN MARINE SEISMIC SURVEYS

(75) Inventors: Roald G. van Borselen, Voorschoten (NL); Robertus F. Hegge, Rijswijk (NL)

(73) Assignee: PGS Geophysical AS, Lysaker (NO)

( * ) Notice: Subject to any disclaimer, the term of this patent is extended or adjusted under 35 U.S.C. 154(b) by 246 days.

(21) Appl. No.: 12/806,544

(22) Filed: Aug. 16, 2010

(65) Prior Publication Data
US 2012/0039149 A1 Feb. 16, 2012

(51) Int. Cl.
*G01V 1/38* (2006.01)
(52) U.S. Cl. .......................................................... 367/24
(58) Field of Classification Search .................. 367/24, 367/73, 21; 702/14, 17
See application file for complete search history.

(56) References Cited

U.S. PATENT DOCUMENTS

| | | | |
|---|---|---|---|
| 5,717,655 A | 2/1998 | Beasley | |
| 5,924,049 A | 7/1999 | Beasley et al. | |
| 6,545,944 B2 | 4/2003 | De Kok | |
| 6,654,694 B2 * | 11/2003 | Fokkema et al. | 367/24 |
| 6,882,938 B2 | 4/2005 | Vaage et al. | |
| 6,906,981 B2 | 6/2005 | Vaage | |
| 6,961,284 B2 | 11/2005 | Moldoveanu | |
| 7,218,572 B2 | 5/2007 | Parkes | |
| 7,492,665 B2 * | 2/2009 | Robertsson et al. | 367/40 |
| 7,684,281 B2 | 3/2010 | Vaage et al. | |
| 2008/0019215 A1 * | 1/2008 | Robertsson et al. | 367/19 |
| 2009/0323469 A1 | 12/2009 | Beasley | |
| 2010/0008184 A1 * | 1/2010 | Hegna et al. | 367/21 |
| 2010/0039894 A1 | 2/2010 | Abma | |
| 2010/0097888 A1 * | 4/2010 | Neelamani et al. | 367/53 |
| 2011/0096625 A1 * | 4/2011 | Rentsch et al. | 367/38 |
| 2012/0039149 A1 * | 2/2012 | van Borselen et al. | 367/24 |

FOREIGN PATENT DOCUMENTS
EP 2420865 * 2/2012

OTHER PUBLICATIONS

Egan, Mark et al, 2007, "Full deghosting of OBC data with over/under source acquisition", SEG Ann. Mtg., Exp. Abstr., pp. 31-35.
B.J. Posthumus, 1993, "Deghosting using a twin streamer configuration", Geophysical Prospecting, vol. 41, pp. 267-286.
D.J. Verschuur, A.J. Berkhout, 1997, "Estimation of multiple scattering by iterative inversion, Part II: Practical aspects and examples", Geophysics, V. 62, 5, pp. 1596-1611.
Peeter Akerberg, Gary Hampson, James Ricket, Harry Martin, Jeff Cole, (2008), "Simultaneous source separation by sparse Radon transform", SEG Las Vegas Annual Meeting, pp. 2.
Simon Spitz, Gary Hampson, Antonio Pica, (2008), "Simultaneous source separation: a prediction-subtraction approach", SEG Las Vegas Annual Meeting, pp. 2801-2805.
David J. Monk, (1990), "Wavefield separation of twin streamer data", First Break, vol. 8, No. 3, pp. 96-104.
Ziolkowski, A. et al., 1982, "The signature of an air gun array: Computation from near-field measurements including interactions", Geophysics, vol. 47, No. 10, p. 1413-1421.

* cited by examiner

*Primary Examiner* — Daniel Pihulic

(57) ABSTRACT

An operator is applied in a frequency domain to multiple source seismic data acquired in a marine survey, with multiple sources substantially horizontally collocated and at different depths, to generate an estimate of a primary source wavefield, the operator constructed to compensate for time delays between and for different depths of the primary and secondary sources. The primary source wavefield estimate is adaptively subtracted from the multiple source seismic data to generate secondary source wavefield estimates. Another operator is applied in the frequency domain to the secondary source wavefield estimates to generate another primary source wavefield estimate, the operator constructed to compensate for time delays between and for different depths of the primary and secondary sources. The primary and secondary source estimates are used, after further iterative refinements to remove noise, to generate upgoing and downgoing wavefield components of the multiple source seismic data.

18 Claims, 4 Drawing Sheets

METHOD FOR SEPARATING SEISMIC SOURCES IN MARINE SEISMIC SURVEYS

CROSS-REFERENCES TO RELATED APPLICATIONS

Not Applicable

FEDERALLY SPONSORED RESEARCH OR DEVELOPMENT

Not Applicable

SEQUENCE LISTING, TABLE OR COMPUTER LISTING

Not Applicable

BACKGROUND OF THE INVENTION

1. Field of the Invention

This invention relates generally to the field of geophysical prospecting. More particularly, the invention relates to the field of imaging marine seismic streamer data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times (the activation commonly known as a "shot"). Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and returning from reflective interfaces. The pressure sensors and particle motion sensors may be deployed in close proximity, collocated in pairs or pairs of arrays along a seismic cable. An alternative to having the geophone and hydrophone co-located, is to have sufficient spatial density of sensors so that the respective wavefields recorded by the hydrophone and geophone can be interpolated or extrapolated to produce the two wavefield signals at the same location.

Dual sensor recordings aim to decompose the recorded seismic data into upgoing and downgoing wavefield components. After decomposition, the obtained upgoing wavefields represents a wavefield that no longer contains downward propagating wavefields. In other words, the upgoing wavefields no longer contain interfering reflection events that first have been reflected at the water surface, propagating downwards before being recorded by the seismic receivers, such as hydrophones and geophones. Because these interfering downgoing wavefields, known as "receiver ghosts", have been removed, the bandwidth of the recorded signal has increased, which aids in the interpretation of the recorded data at later stages.

Interference also occurs on the source side. A seismic source not only generates waves that propagate downward, the source also generates waves that first propagate upwards, before being reflected at the water surface and propagating downwards into the earth. This reflected wavefield, known as a "source ghost", could be considered to be generated by a mirror source located at the mirror location with respect to the sea surface. This interference reduces the bandwidth of the recorded seismic signal.

One way to overcome the interference of the wavefields generated by the source and its source ghost is to use a multiple source geometry, where the sources are in close proximity and fired at different times. If it is possible to separate the wavefields that have been generated by the individual sources, then a "source deghosting" operator can be applied to the data that aims to collapse the wavefields generated by the source and its ghost into one single source wavefield.

To separate the source wavefields generated by the multiple sources, different approaches can be used. One approach is to make use of existing, well-established noise removal techniques, such as f-k filtering, Radon filtering, or incoherent noise removal techniques. These conventional methods are applied after sorting the data, sorted in a common shot domain, into a different order (such as common receiver domain, common mid-point domain, common offset domain), since the interference effects may become more random in such domains.

Thus, a need exists for a method for separating seismic source wavefields in marine seismic surveys. Preferably, the method is data-driven, in only using recorded seismic data.

BRIEF SUMMARY OF THE INVENTION

The invention is a method for imaging the earth's subsurface. A programmable computer is used to perform the following. An operator is applied in a frequency domain to multiple source seismic data acquired in a marine survey, with multiple sources substantially horizontally collocated and at different depths, to generate an estimate of a primary source wavefield, the operator constructed to compensate for time delays between a primary source and one or more secondary sources and for different depths of the primary and secondary sources. The estimate of the primary source wavefield is adaptively subtracted from the multiple source seismic data, thereby generating an estimate of one or more secondary source wavefields. Another operator is applied in the frequency domain to the estimates of the one or more secondary source wavefields to generate another estimate of the primary source wavelet, the operator constructed to compensate for time delays between the primary source and the one or more secondary sources and for different depths of the primary and secondary sources. The estimates of the primary source and the one or more secondary sources are used, after further iterative refinements to remove noise, to generate upgoing and downgoing wavefield components of the multiple source seismic data.

BRIEF DESCRIPTION OF THE DRAWINGS

The invention and its advantages may be more easily understood by reference to the following detailed description and the attached drawings, in which.

Figure 1:
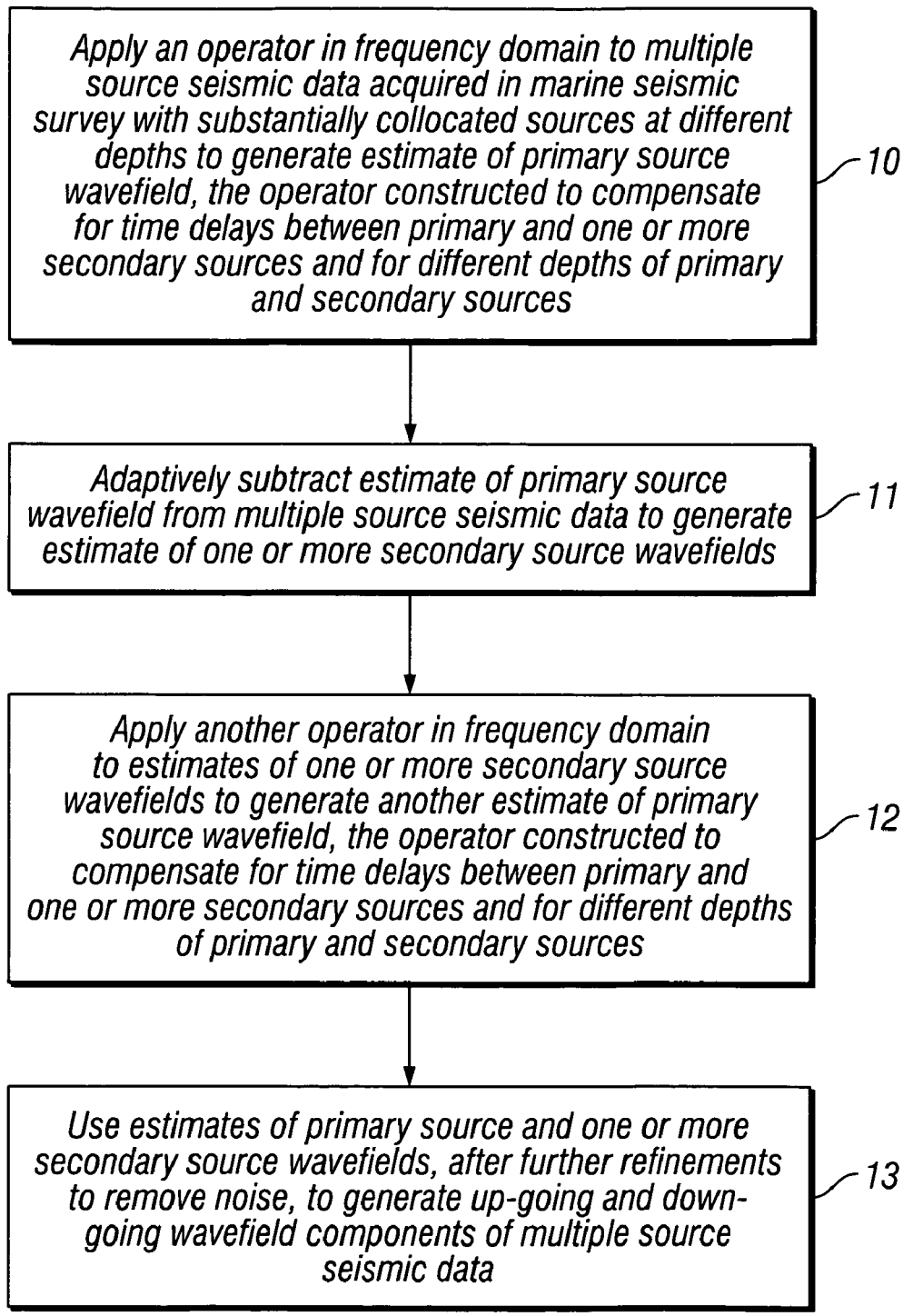
FIG. 1 is a flowchart illustrating an embodiment of the method of the invention for separating seismic sources in marine seismic surveys.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for separating source wavefields in marine seismic data acquired with multiple sources fired at different depths, at different times, possibly even random times, but where all sources are substantially horizontally collocated, that is, in close proximity to each other. The invention utilizes an operator that satisfies the wave-equation. In this operator, the time delays between the different sources are compensated for, as well as the fact that the sources are fired at different depths.

Time delays between the source wavefields are accounted for through the application of a phase shift in the Laplace domain. For time delay $t_0$, this can be expressed by:

$$p(x, t-t_0) \to \exp(-st_0)\tilde{p}(x,s), \quad (1)$$

in which the forward Laplace transform from the space-time domain (x,t) to the Laplace domain (x,s), designated by a tilde , is defined in general as $$\tilde{p}(x,s) = \int_{eT} \exp(-st) p(x,t) dt, \quad (2)$$

and the corresponding inverse Laplace transform is defined as:

$$\chi_T(t) p(x,t) = \frac{1}{2\pi j} \int_{s-j\infty}^{s+j\infty} \exp(st) \tilde{p}(x,s) ds. \quad (3)$$

Here $$\chi_T(t) = \left\{ 1, \frac{1}{2}, 0 \right\} \text{ for } t \in \{T, \partial T, T\},$$

where $$T = \{t \in \Re ; t > t_0\}; \partial T = \{t \in \Re ; t = t_0\}; T = \{t \in \Re ; t < t_0\},$$

and x is space, t is time, and s is the Laplace frequency parameter, discussed below.

In the following, the invention will be illustrated as acting on the pressure wavefield p(x,t), typically detected by pressure sensors such as hydrophones, although the type of wavefield and the type of sensors employed is not a restriction of the invention. The invention may be employed with any type of appropriate seismic sensor and its detected wavefields. For one example, particle motion wavefields and particle motion sensors could be employed. Modifying the following equations to accommodate other wavefields is straight forward.

Traditionally, the Laplace parameter s is given by the purely imaginary number:

$$s = j\omega = j2\pi f,$$

where j is the imaginary unit $\sqrt{-1}$, f is angular frequency, and f is real frequency. In the invention, however, the Laplace parameter s is instead given by:

$$s = j\omega + \epsilon = j2\pi f + \epsilon, \quad (4)$$

where $\epsilon$ is the real part of the complex Laplace frequency parameter s. The real part $\epsilon$ in Equation (4) may be expressed as, but is not limited to, the following:

$$\epsilon = \text{constant};$$

$$E = \epsilon(x), \text{where } x = (x_1, x_2, x_3);$$

$$\epsilon = \epsilon(t); \epsilon = \epsilon(x,t);$$

$$\epsilon = \epsilon(f); \epsilon = \epsilon(x,f). \quad (5)$$

Here, $x_1$ and $x_2$ are horizontal spatial coordinates, such as in-line and cross-line directions, respectively, and $x_3$ is a vertical spatial coordinate, such as depth.

To compensate for the fact that the sources are at different depths, multi-dimensional "deghosting" and "reghosting" operators can be used. The deghosting operator turns a measured wavefield $\tilde{P}_{measured}(s\alpha_1, s\alpha_2, x_3^S; s)$, generated by a source located at depth $x_3 = x_3^S$ and its mirror source at depth $x_3 = -x_3^S$, into a deghosted wavefield $P_{deghost}(s\alpha_1, s\alpha_2, 0; s)$ that has a source located at the free surface at depth $x_3=0$. This deghosting operator has the following form:

$$\tilde{P}_{deghost}(s\alpha_1, s\alpha_2, x_3=0; s) = \frac{\tilde{P}_{measured}(s\alpha_1, s\alpha_2, x_3=x_3^S; s)}{2\sinh(s\Gamma x_3^S)}, \quad (6)$$

in which $s\alpha_1$ is an inline spectral Laplace parameter, $s\alpha_2$ is an cross-line spectral Laplace parameter, and $$s\Gamma = j\sqrt{\left(\frac{2\pi f}{c}\right)^2 - (s\alpha_1)^2 - (s\alpha_2)^2},$$

where c is the velocity of sound in water.

The reghosting operator does the opposite of the deghosting operator in Equation (6). The reghosting operator takes a deghosted wavefield $\tilde{P}_{deghost}(s\alpha_1,s\alpha_2,0;s)$ that has its source location at the free-surface ($x_3=0$) and generates a reghosted wavefield $\tilde{P}_{reghost}(s\alpha_1,s\alpha_2,x_3^S;s)$ that would have been generated by a source at depth $x_3=x_3^S$ and its mirror location at depth $x_3=x_3^S$. This reghosting operator takes the following form:

$$\tilde{P}_{reghost}(s\alpha_1,s\alpha_2,x_3=x_3^S;s)=\tilde{P}_{deghost}(s\alpha_1,s\alpha_2,x_3=0;s)2\sin h(s\Gamma x_3^S). \quad (7)$$

In a dual source configuration, the measurement equals the sum of a primary source plus a secondary source:

$$\tilde{P}_{Dual}(s\alpha_1,s\alpha_2,x_3^{S1},x_3^{S2};s)=\tilde{P}_{Primary}(s\alpha_1,s\alpha_2,x_3^{S1};s)+\tilde{P}_{secondary}(s\alpha_1,s\alpha_2,x_3^{S2};s). \quad (8)$$

The dual source measurement is a function of both the depth $x_3=x_3^{S1}$ of the primary source and the depth $x_3=x_3^{S2}$ of the secondary source.

Using the deghosting and reghosting operators as defined in Equations (6) and (7), respectively, and also using Equation (1), the dual source measurement can be described as:

$$\tilde{P}_{dual}(s\alpha_1, s\alpha_2, x_3^{S1}, x_3^{S2}; s) = \quad (9)$$

$$\tilde{P}_{primary}(s\alpha_1, s\alpha_2, x_3^{S1}; s)\left[1 + \exp(-st_0)\frac{\sinh(s\Gamma x_3^{S2})}{\sinh(s\Gamma x_3^{S1})}\right],$$

where $t_0$ now represents the time delay between the primary and secondary sources. The reghosting operator is applied to the secondary source and the deghosting operator is applied to the primary source.

From Equation (9), the wavefield from the primary source can be described by:

$$\tilde{P}_{primary}(s\alpha_1, s\alpha_2, x_3^{S1}; s) = \frac{\tilde{P}_{dual}(s\alpha_1, s\alpha_2, x_3^{S1}, x_3^{S2}; s)}{\left[1 + \exp(-st_0)\frac{\sinh(s\Gamma x_3^{S2})}{\sinh(s\Gamma x_3^{S1})}\right]}. \quad (10)$$

From Equations (7) and (9), the wavefield from the primary source can also be given by:

$$\tilde{P}_{Primary}(s\alpha_1, s\alpha_2, x_3^{S1}; s) = \quad (11)$$

$$\tilde{P}_{Secondary}(s\alpha_1, s\alpha_2, x_3^{S2}; s)\frac{\sinh(s\Gamma x_3^{S1})}{[\sinh(s\Gamma x_3^{S2})\exp(-st_0)]}.$$

Once an estimate of the primary source wavefield has been obtained, this estimate can be refined. Two embodiments of the method for refining the primary source estimate will be presented here, but the method of the invention is not restricted to these two embodiments alone. In the first embodiment, the secondary source wavefield can be derived through (adaptive) subtraction of the estimated primary source wavefield from the original dual source measurement. After that, both estimates can be updated. In one embodiment, pre-conditioning is applied to the secondary source measurement to remove any unwanted noise. This estimate of the secondary source measurement is used to compute a new estimate of the primary source measurement by applying an operator to the estimate of the secondary source measurement, using Equation (11). This new estimate of the primary source measurement is then adaptively optimized again such that subtraction from the input data would lead to minimum energy. Then, this final optimized estimate of the primary source measurement is subtracted from the dual source measurement to obtain a final estimate of the secondary source measurement.

In the second embodiment for refinement, the estimate of the primary source measurement and the estimate of the secondary source measurement are subtracted from the dual source measurement to generate a residual. The residual is given by:

$$\tilde{R}(s\alpha_1,s\alpha_2,x_3^{S1},x_3^{S2};s)=\tilde{P}_{Dual}(s\alpha_1,s\alpha_2,x_3^{S1},x_3^{S2};s)-\tilde{P}_{Primary}(s\alpha_1,s\alpha_2,x_3^{S1};s)-\tilde{P}_{Secondary}(s\alpha_1,s\alpha_2,x_3^{S2};s). \quad (12)$$

Then, the process starts again and the new residual estimate from the next iteration is added to the previous iteration results. In particular, the two embodiments use the operators described above.

The method of the invention applies to multiple source seismic data, not just dual source seismic data, as illustrated above for purposes of showing the principles clearly. The method of the invention applies equally to one or more secondary sources. Thus, there can be, in general, N−1 secondary sources positioned at depths $x_3=x_3^{Sm}$, for m=2, 3, N, with corresponding wavefields $\tilde{P}_{Sm}(s\alpha_1,s\alpha_2,x_3^{Sm};s)$. Equation (8) becomes:

$$\tilde{P}_{Multiple}(s\alpha_1, s\alpha_2, x_3^{S1}, x_3^{S2}, \ldots, x_3^{SN}; s) = \quad (8a)$$

$$\tilde{P}_{Primary}(s\alpha_1, s\alpha_2, x_3^{S1}; s) + \sum_{m=2}^{N}\tilde{P}_{Sm}(s\alpha_1, s\alpha_2, x_3^{Sm}; s).$$

Equation (9) becomes:

$$\tilde{P}_{Multiple}(s\alpha_1, s\alpha_2, x_3^{S1}, x_3^{S2}, \ldots, x_3^{SN}; s) = \quad (9a)$$

$$\tilde{P}_{Primary}(s\alpha_1, s\alpha_2, x_3^{S1}; s)\left[1 + \sum_{m=2}^{N}\exp(-st_m)\frac{\sinh(s\Gamma x_3^{Sm})}{\sinh(s\Gamma x_3^{S1})}\right],$$

where $t_m$ now represents the time delay between the primary source and the $m^{th}$ secondary source.

Equation (10) becomes:

$$\tilde{P}_{Primary}(s\alpha_1, s\alpha_2, x_3^{S1}; s) = \frac{\tilde{P}_{Multiple}(s\alpha_1, s\alpha_2, x_3^{S1}, x_3^{S2}, \ldots, x_3^{SN}; s)}{\left[1 + \sum_{m=2}^{N} \exp(-st_m)\frac{\sinh(s\Gamma x_3^{Sm})}{\sinh(s\Gamma x_3^{S1})}\right]}. \quad (10a)$$

Equation (11) becomes:

$$\tilde{P}_{Primary}(s\alpha_1, s\alpha_2, x_3^{S1}; s) = \frac{\sum_{m=2}^{N} \tilde{P}_{Sm}(s\alpha_1, s\alpha_2, x_3^{Sm}; s)}{\sum_{m=2}^{N} \exp(-st_m)\frac{\sinh(s\Gamma x_3^{Sm})}{\sinh(s\Gamma x_3^{S1})}}. \quad (11a)$$

Finally, Equation (12) becomes:

$$\tilde{R}(s\alpha_1, s\alpha_2, x_3^{S1}, x_3^{S2}, \ldots, x_3^{SN}; s) = \quad (12a)$$
$$\tilde{P}_{Dual}(s\alpha_1, s\alpha_2, x_3^{S1}, x_3^{S2}, \ldots, x_3^{SN}; s) -$$
$$\tilde{P}_{Primary}(s\alpha_1, s\alpha_2, x_3^{S1}; s) - \sum_{m=2}^{N} \tilde{P}_{Sm}(s\alpha_1, s\alpha_2, x_3^{Sm}; s).$$

Figure 2:
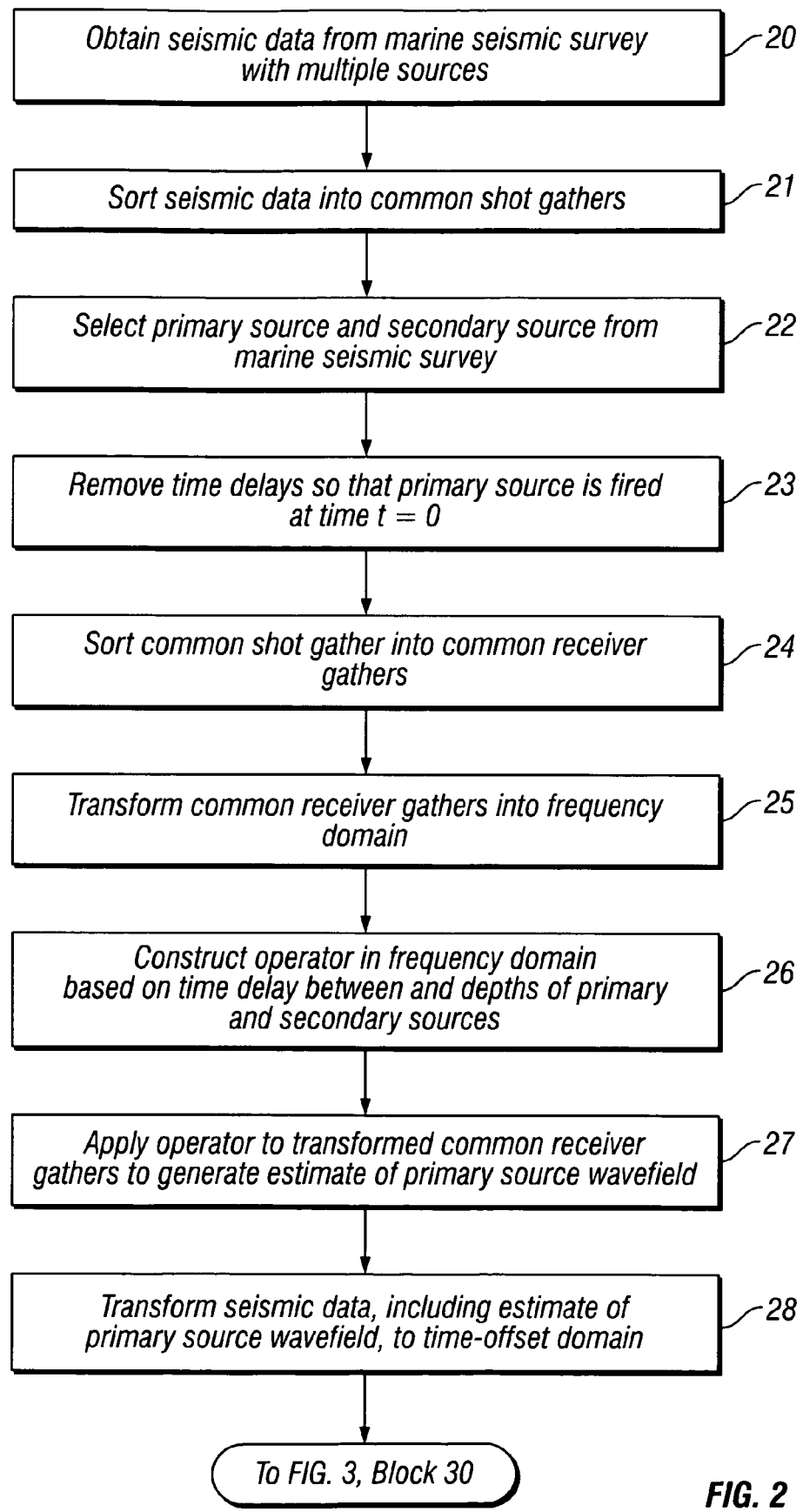
FIG. 2 is a flowchart illustrating an initial portion of another embodiment of the method of the invention for separating seismic sources in marine seismic surveys.
Figure 3:
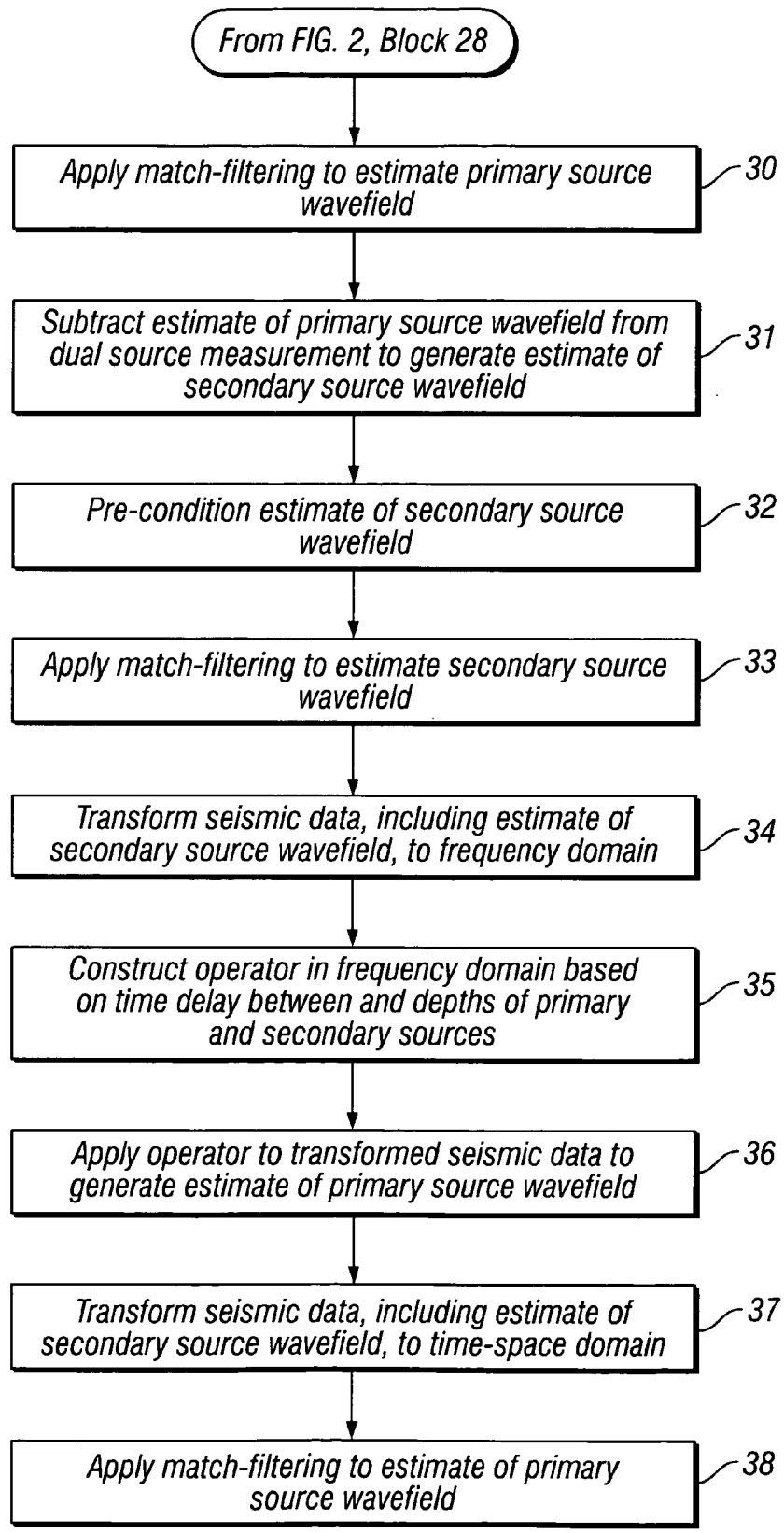
FIG. 3 is a flowchart illustrating a final portion of the embodiment of the method of the invention for separating seismic sources in marine seismic surveys begun in FIG. 2.

The method of the invention is described below with regard to the flowcharts in FIGS. 1 to 3. The flowchart in FIG. 1 illustrates a general embodiment of the method of the invention for separating multiple sources. The flowchart in FIG. 2 illustrates an initial portion of a more general embodiment of the method of the invention for the dual source embodiment. The flowchart in FIG. 3 illustrates a first embodiment for a final portion of the process begun in FIG. 2. FIGS. 2 and 3 treat the dual source embodiment for purposes of illustrative clarity only. The number of sources is not intended as a limitation of the invention.

FIG. 1 is a flowchart illustrating an embodiment of the method of the invention for separating seismic sources in marine seismic surveys.

At block 10, an operator is applied in a frequency domain to multiple source seismic data acquired in a marine seismic survey, with multiple sources substantially horizontally collocated and at different depths, to generate an estimate of a primary source wavefield, the operator constructed to compensate for time delays between a primary source and one or more secondary sources and for different depths of the primary and secondary sources.

At block 11, the estimate of the primary source wavefield is adaptively subtracted from the multiple source seismic data to generate estimates of one or more secondary source wavefields.

At block 12, another operator is applied in the frequency domain to the estimates of the one or more secondary source wavefields to generate another estimate of the primary source wavefield, the operator constructed to compensate for time delays between the primary source and the one or more secondary sources and for different depths of the primary and secondary sources.

At block 13, the estimates of the primary source and the one or more secondary source wavefields, after further iterative refinements to remove noise, are used to generate upgoing and downgoing wavefield components of the multiple source seismic data.

FIGS. 2 and 3 are flowcharts providing a more detailed illustration of the invention, for the dual source embodiment, than the more general embodiment illustrated in FIG. 1. FIG. 2 is a flowchart illustrating an initial portion of another embodiment of the method of the invention for separating seismic sources in marine seismic surveys.

At block 20, seismic data from a marine seismic survey are obtained. The seismic data are acquired with multiple sources at different depths, fired at different times, but where all sources are in close proximity to each other. Obtaining the seismic data includes retrieving previously acquired data from storage, such as computer memory or other types of memory storage devices or media.

At block 21, the seismic data from block 20 are sorted into common shot gathers (also known as common source gathers).

At block 22, two sources are selected from the marine seismic survey in block 21. One source, the one fired earlier, is designated as the "primary source" and the other source is designated as the "secondary source". The primary source is at depth $x_3 = x_3^{S1}$ and the secondary source is at depth $x_3 = x_3^{S2}$. The time delay between the primary and secondary sources is designated as $t_0$. This combination of primary source and secondary source constitutes the dual source measurement.

At block 23, any time delay for the earliest source from block 22 is removed, such that the primary source is fired at reference time t=0.

At block 24, the common shot gathers, after the time correction in block 23, are sorted into common receiver gathers. Two exemplary embodiments will be described here, but these examples are not intended to be a limitation of the invention. In the first embodiment, interpolation is applied to reduce the effective source spacing, if necessary. Then, the common shot gathers are resorted into common receiver gathers. In the second embodiment, reciprocity is used to build a common receiver gather at receiver depth $x_3 = x_3^S$ and source depth at $x_3 = x_3^R$ from a shot gather with source depth $x_3 = x_3^S$ and receiver depth $x_3 = x_3^R$.

At block 25, the common receiver gathers from block 24 are transformed to a frequency domain. In various embodiments, the common receiver gathers are transformed, for example, to the frequency-wavenumber domain, the frequency-slowness domain, the spectral Laplace domain, or any other appropriate frequency domain. The particular domain employed in the transform is not to be considered a limitation of the method of the invention.

At block 26, an operator is constructed in the frequency domain, using the time delay $t_0$ between the primary and secondary sources, and the source depths $x_3 = x_3^{S1}$ and $x_3 = x_3^{S2}$ of both the primary and secondary sources, respectively. In one embodiment, the operator is constructed as in Equation (10), above. Other equations are also appropriate and are intended to be included in the invention. For example, such additional equations would include, but not be limited to, similar, but more simplified equations that ignore offset coordinates, such as x, y, or both.

At block 27, the operator constructed in block 26 is applied to the transformed data, the common receiver gathers, from block 25. The operator reconstructs the data from the primary source at depth $x_3 = x_3^{S1}$, where $x_3^{S1}$ is the depth of the primary source. Application of the operator generates a transformed estimate of the primary source wavefield.

At block 28, the data reconstructed in block 27, including the transformed estimate of the primary source wavefield, are transformed back to the time-offset domain to generate an estimate of the primary source wavefield. The process then proceeds to step 30 of FIG. 3 to continue.

FIG. 3 is a flowchart illustrating a final portion of the embodiment of the method of the invention for separating seismic sources in marine seismic surveys begun in FIG. 2. The estimate of the primary source wavefield from block 28 of FIG. 2 is provided for block 30 of FIG. 3.

At block 30, the estimate of the primary source wavefield from block 28 of FIG. 2 is modified by applying match-filtering. In one embodiment, this match-filtering is optional. In this process, a filter is determined and applied to the estimated primary source such that after convolution of the filter with the estimated primary source wavefield, the subtraction of the match-filtered primary estimate from the dual source measurement leads to minimum energy. In other words, the estimated primary source wavefield is adaptively optimized such that it matches the data in the dual source measurement optimally in a least-squares sense.

At block 31, the match-filtered estimate of the primary source wavefield from block 30 is then subtracted from the dual source measurement to obtain an estimate of the secondary source wavefield. In one embodiment the subtracting is adaptive subtracting.

At block 32, the estimate of the secondary wavefield from block 31 is pre-conditioned further, for example by removing remnant noise, or by removal of direct or refracted energy. In one embodiment, this pre-conditioning is optional.

At block 33, the estimate of the secondary source wavefield from block 32 is modified by applying match-filtering. In one embodiment, this match-filtering is optional. In this process, a filter is determined and applied to the estimated secondary source such that after convolution of the filter with the estimated secondary source wavefield, the subtraction of the match-filtered secondary estimate from the dual source measurement leads to minimum energy. In other words, the estimated secondary source wavefield is adaptively optimized such that it matches the data in the dual source measurement optimally in a least-squares sense. This estimate of the secondary source wavefield can now be used to obtain an even better estimate of the primary source wavefield.

At block 34, the seismic data, including the estimate of the secondary source wavefield from block 33, are transformed again to the frequency domain.

At block 35, an operator is constructed to generate a primary source wavefield from the estimate of the secondary source wavefield from block 34 by accounting for the time delay between the two shots and for the fact that one source located at depth $x_3 = x_3^{S1}$ and the other at depth $x_3 = x_3^{S2}$. In one embodiment, the operator is constructed as in Equation (11), above.

At block 36, the operator constructed in block 35 is applied to the transformed seismic data, including the estimate of the secondary source wavefield from block 34. Application of the operator generates a transformed estimate of the primary source wavefield.

At block 37, the seismic data, including the estimate of the secondary source wavefield from block 36, is transformed back to the time-space domain to obtain a new estimate of the primary source wavefield.

At block 38, the new estimate of the primary source wavefield from block 37 is modified by applying match-filtering. In one embodiment, this match-filtering is optional. In this process, a filter is determined and applied to the estimated primary source such that after convolution of the filter with the estimated primary source wavefield, the subtraction of the match-filtered primary estimate from the dual source measurement leads to minimum energy. In other words, the estimated primary source wavefield is adaptively optimized such that it matches the data in the dual source measurement optimally in a least-squares sense.

Figure 4:
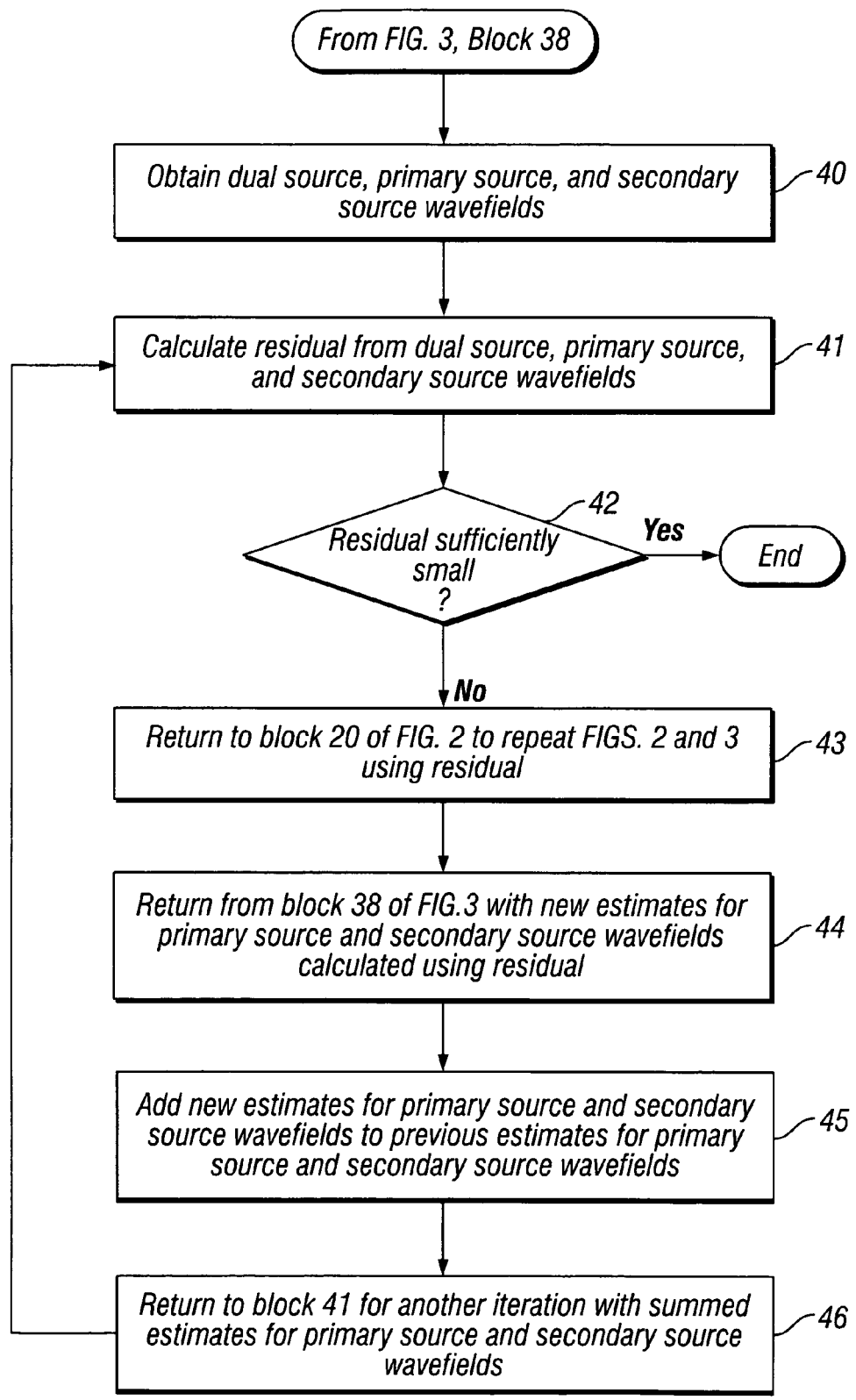
FIG. 4 is a flowchart illustrating a further embodiment of the method of the invention for separating seismic sources in marine seismic surveys begun in FIGS. 2 and 3.

In another embodiment, a residual energy is computed after subtraction of the sum of the estimated separated source wavefields. Then, the process of FIGS. 2 and 3 can be repeated using this residual energy. FIG. 4 is a flowchart illustrating a further embodiment of the method of the invention for separating seismic sources in marine seismic surveys begun in FIGS. 2 and 3.

At block 40, the dual source wavefield from block 25 of FIG. 2, the primary source wavefield from block 38 of FIG. 3, and the secondary source wavefield from block 33 of FIG. 3 are obtained for the current iteration.

At block 41, a residual is calculated from the dual source wavefield, the primary source wavefield, and the secondary source wavefield from block 40. In one embodiment, the residual is calculated as in Equation (12), above.

At block 42, it is determined if the residual from block 41 is sufficiently small. In a particular embodiment, the residual is compared to a set threshold to determine if the residual is less than the threshold. If the residual is sufficiently small, then the process ends. If the residual is not sufficiently small, then the process continues to block 43.

At block 43, the process returns to block 20 of FIG. 2 to repeat the process given in FIGS. 2 and 3, using the residual instead of the wavefields.

At block 44, the process returns from block 38 of FIG. 3 with new estimates for the primary source and secondary source wavefields, calculated using the residual.

At block 45, the estimates from block 44 for the primary source and secondary source wavefields, calculated using the residual, are added to the previously calculated estimates of the primary source and secondary source wavefields from the previous iteration.

At block 46, the process returns to block 41 with the new estimates, after the addition in block 45, of the primary source and secondary source wavefields.

Once the separated sources are available, source wavefield decomposition can be applied using established methods. The source wavefield separation method described above can be combined with the source wavefield decomposition. In particular, both separation and decomposition methods are carried out in the same frequency domain, so, in one embodiment, the two operators executing the separation and decomposition methods can be combined into one application for computational efficiency.

The method of the invention does not make use of any a priori information about the subsurface geology. Only acquisition-related information is used to separate the different source contributions.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for separating seismic sources, comprising:
    using a programmable computer to perform the following:
        applying an operator in a frequency domain to multiple source seismic data acquired in a marine seismic survey with multiple sources substantially horizontally collocated and at different depths to generate an estimate of a primary source wavefield, the operator constructed to compensate for a time delay between a primary source and one or more secondary sources and for different depths of the primary and secondary sources;
        adaptively subtracting the estimate of the primary source wavefield from the multiple-source seismic data to generate an estimate of one or more secondary source wavefields;
        applying another operator in the frequency domain to the estimates of the one or more secondary source wavefields to generate another estimate of the primary source wavefield, the operator constructed to compensate for time delays between the primary source and the one or more secondary sources and for different depths of the primary and secondary sources; and
        using the estimates of the primary source and the one or more secondary source wavefields, after further iterative refinements to remove noise, to generate upgoing and downgoing wavefield components of the multiple source seismic data.

2. The method of claim 1, wherein the applying an operator to multiple source seismic data comprises the initial steps of:
    obtaining seismic data from a marine seismic survey;
    sorting the seismic data into common shot gathers;
    selecting a primary source and one or more secondary source from the marine seismic survey;
    removing any time delay so that the primary source is activated at time zero;
    sorting the common shot gathers into common receiver gathers; and
    transforming the common receiver gathers to the frequency domain.

3. The method of claim 2, wherein the applying an operator to multiple source seismic data further comprises:
    transforming the seismic data, including the estimate of the primary source wavefield, from the frequency domain to the time-offset domain; and
    applying match-filtering to the estimate of the primary source wavefield.

4. The method of claim 3, wherein the adaptively subtracting further comprises:
    pre-conditioning the estimates of the one or more secondary source wavefields;
    applying match-filtering to the estimates of the one or more secondary source wavefields; and
    transforming the seismic data, including the estimates of the one or more secondary source wavefields, from the time-offset domain to the frequency domain.

5. The method of claim 4, wherein the applying the operator further comprises:
    transforming the seismic data, including the estimate of the primary source wavefield, from the frequency domain to the time-space domain; and
    applying match-filtering to the estimate of the primary source wavefield.

6. The method of claim 1, wherein the operator applied to multiple source seismic data, in the case of dual sources, is given by the following expression:

$$\tilde{P}_{primary}(s\alpha_1, s\alpha_2, x_3^{S1}; s) = \frac{\tilde{P}_{dual}(s\alpha_1, s\alpha_2, x_3^{S1}, x_3^{S2}; s)}{\left[1 + \exp(-st_0)\frac{\sinh(s\Gamma x_3^{S2})}{\sinh(s\Gamma x_3^{S1})}\right]},$$

where $\tilde{P}_{Primary}$ is the estimate of the primary source wavefield, $\tilde{P}_{Dual}$ is the dual source seismic data, $t_0$ is the time delay between the primary and secondary sources, $x_3^{S1}$ is the depth of the primary source, $x_3^{S2}$ is the depth of the secondary source, $s\alpha_1$ is an inline spectral Laplace parameter, $s\alpha_2$ is an cross-line spectral Laplace parameter, and $$s\Gamma = j\sqrt{\left(\frac{2\pi f}{c}\right)^2 - (s\alpha_1)^2 - (s\alpha_2)^2},$$

where f is frequency, and c is the velocity of sound in water.

7. The method of claim 6, wherein the operator applied to the estimate of the secondary source wavefield is given by the following expression:

$$\tilde{P}_{Primary}(s\alpha_1, s\alpha_2, x_3^{S1}; s) =$$
$$\tilde{P}_{Secondary}(s\alpha_1, s\alpha_2, x_3^{S2}; s) \frac{\sinh(s\Gamma x_3^{S1})}{[\sinh(s\Gamma x_3^{S2})\exp(-st_0)]},$$

where $\tilde{P}_{Secondary}$ is the estimate of the secondary source wavefield.

8. The method of claim 7, further comprising:
calculating a residual from the dual source and estimates of the primary source and secondary source wavefields;
determining if the residual is sufficiently small to end iterations;
applying the operators to the residual to calculate new estimates of the primary source and secondary source wavefields;
adding the new estimates of the primary source and secondary source wavefields to the previous estimates of the primary source and secondary source wavefields; and
repeating the above calculating, determining, applying, and adding steps.

9. The method of claim 8, wherein the residual $\tilde{R}$ is calculated by applying the following equation:

$$\tilde{R}(s\alpha_1, s\alpha_2, x_3^{S1}, x_3^{S2}; s) = \tilde{P}_{Dual}(s\alpha_1, s\alpha_2, x_3^{S1}, x_3^{S2}; s) - \tilde{P}_{Primary}(s\alpha_1, s\alpha_2, x_3^{S1}, x_3^{S2}; s) - \tilde{P}_{Secondary}(s\alpha_1, s\alpha_2, x_3^{S1}, x_3^{S2}; s).$$

10. A non-transitory computer readable medium with a computer program stored thereon, the program having logic operable to cause a programmable computer to perform steps to provide an image of earth's subsurface from seismic data from a multi-azimuth marine seismic survey, comprising:
applying an operator in a frequency domain to multiple source seismic data acquired in a marine seismic survey with multiple sources substantially horizontally collocated and at different depths to generate an estimate of a primary source wavefield, the operator constructed to compensate for a time delay between a primary source and one or more secondary sources and for different depths of the primary and secondary sources;
adaptively subtracting the estimate of the primary source wavefield from the multiple-source seismic data to generate an estimate of one or more secondary source wavefields;
applying another operator in the frequency domain to the estimates of the one or more secondary source wavefields to generate another estimate of the primary source wavefield, the operator constructed to compensate for time delays between the primary source and the one or more secondary sources and for different depths of the primary and secondary sources; and using the estimates of the primary source and the one or more secondary source wavefields, after further iterative refinements to remove noise, to generate upgoing and downgoing wavefield components of the multiple source seismic data.

11. The medium of claim 10, wherein the applying an operator to multiple source seismic data comprises the initial steps of:
obtaining seismic data from a marine seismic survey;
sorting the seismic data into common shot gathers;
selecting a primary source and one or more secondary source from the marine seismic survey;
removing any time delay so that the primary source is activated at time zero;
sorting the common shot gathers into common receiver gathers; and
transforming the common receiver gathers to the frequency domain.

12. The medium of claim 11, wherein the applying an operator to multiple source seismic data further comprises:
transforming the seismic data, including the estimate of the primary source wavefield, to the time-offset domain; and
applying match-filtering to the estimate of the primary source wavefield.

13. The medium of claim 12, wherein the adaptively subtracting further comprises:
pre-conditioning the estimates of the one or more secondary source wavefields;
applying match-filtering to the estimates of the one or more secondary source wavefields; and
transforming the seismic data, including the estimates of the one or more secondary source wavefields, to the frequency domain.

14. The medium of claim 13, wherein the applying the operator further comprises:
transforming the seismic data, including the estimate of the primary source wavefield, to the time-space domain; and
applying match-filtering to the estimate of the primary source wavefield.

15. The medium of claim 10, wherein the operator applied to multiple source seismic data, in the case of dual sources, is given by the following expression:

$$\tilde{P}_{primary}(s\alpha_1, s\alpha_2, x_3^{S1}; s) = \frac{\tilde{P}_{dual}(s\alpha_1, s\alpha_2, x_3^{S1}, x_3^{S2}; s)}{\left[1 + \exp(-st_0)\frac{\sinh(s\Gamma x_3^{S2})}{\sinh(s\Gamma x_3^{S1})}\right]},$$

where $\tilde{P}_{Primary}$ is the estimate of the primary source wavefield, $\tilde{P}_{Dual}$ is the dual source seismic data, $t_0$ is the time delay between the primary and secondary sources, $x_3^{S1}$ is the depth of the primary source, $x_3^{S2}$ is the depth of the secondary source, $s\alpha_1$ is an inline spectral Laplace parameter, $s\alpha_2$ is an cross-line spectral Laplace parameter, and $$s\Gamma = j\sqrt{\left(\frac{2\pi f}{c}\right)^2 - (s\alpha_1)^2 - (s\alpha_2)^2},$$

where f is frequency, and c is the velocity of sound in water.

16. The medium of claim 15, wherein the operator applied to the estimate of the secondary source wavefield is given by the following expression:

$$\tilde{P}_{Primary}(s\alpha_1, s\alpha_2, x_3^{S1}; s) = \tilde{P}_{Secondary}(s\alpha_1, s\alpha_2, x_3^{S2}; s)\frac{\sinh(s\Gamma x_3^{S1})}{[\sinh(s\Gamma x_3^{S2})\exp(-st_0)]},$$

where $\tilde{P}_{Secondary}$ is the estimate of the secondary source wavefield.

17. The medium of claim 16, further comprising:
calculating a residual from the dual source and estimates of the primary source and secondary source wavefields;
determining if the residual is sufficiently small to end iterations;
applying the operators to the residual to calculate new estimates of the primary source and secondary source wavefields;
adding the new estimates of the primary source and secondary source wavefields to the previous estimates of the primary source and secondary source wavefields; and
repeating the above calculating, determining, applying, and adding steps.

18. The medium of claim 17, wherein the residual $\tilde{R}$ is calculated by applying the following equation:

$$\tilde{R}(s\alpha_1,s\alpha_2,x_3^{S1},x_3^{S2};s) = \tilde{P}_{Dual}(s\alpha_1,s\alpha_2,x_3^{S1},x_3^{S2};s) - \tilde{P}_{Primary}(s\alpha_1,s\alpha_2,x_3^{S1},x_3^{S2};s) - \tilde{P}_{Secondary}(s\alpha_1,s\alpha_2,x_3^{S1},x_3^{S2};s).$$

* * * * *